(12) United States Patent
Arold

(10) Patent No.: US 6,223,816 B1
(45) Date of Patent: May 1, 2001

(54) HEATING AND/OR AIR CONDITIONING SYSTEM

(75) Inventor: Klaus Arold, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/438,303

(22) Filed: Nov. 12, 1999

(30) Foreign Application Priority Data

Nov. 11, 1998 (DE) ............................................... 198 51 982

(51) Int. Cl.$^7$ ....................................................... B60H 1/00
(52) U.S. Cl. ............................................. 165/203; 165/43
(58) Field of Search ............................... 165/42, 43, 201, 165/202, 203; 236/91 G

(56) References Cited

FOREIGN PATENT DOCUMENTS

| 35 26 518 A1 | 4/1986 | (DE) . |
|---|---|---|
| 37 37 087 A1 | 5/1989 | (DE) . |
| 196 16 965 C1 | 5/1997 | (DE) . |
| 0 102 611 | 9/1988 | (EP) . |
| 2 322 186 | 8/1998 | (GB) . |

Primary Examiner—Ira S. Lazarus
Assistant Examiner—Ljiljana V. Ciric

(74) Attorney, Agent, or Firm—Evenson, McKeown, Edwards & Lenahan, P.L.L.C.

(57) ABSTRACT

The present invention relates to a heating and/or air conditioning system for vehicle interiors with air outlets located at the middle level of the vehicle interior, especially in a dashboard. The outlets include a middle nozzle connected by air ducts with an air distributor, the middle nozzle having a middle nozzle automatic button, with a mixing chamber integrated into the air distributor. The chamber has a cold air duct controlled by a cold air flap for supplying cold air to the mixing chamber and at least one outlet opening to the middle level, with the air to the middle level being controllable by at least one middle level flap, with an automatic control device that comprises an additional automatic button, and with a control device for linking signal values of the adjusting elements and programmed control of adjusting motors to set the air flaps. Provision is made for the cold air flap and the (at least one) middle level flap to be coupled together in terms of their movement possibilities by forced guidance so that, for maximum heating, the cold air flap and the middle level flap are closed, to regulate the air volume to the middle level, the cold air flap is closed and the middle level flap is open to correspond to the desired air flow, and to lower the temperature in the middle level, the middle nozzle automatic button is unlocked and the cold air flap is opened by turning an operating element.

20 Claims, 2 Drawing Sheets

HEATING AND/OR AIR CONDITIONING SYSTEM

This application claims the priority of German application 198 51 982.6–16, filed Nov. 11, 1998, the disclosure of which is expressly incorporated by reference herein.

BACKGROUND AND SUMMARY OF THE INVENTION

The present invention relates to a heating and/or air conditioning system for vehicle interiors with air outlets located at a middle level of the vehicle interior, especially in the dashboard. The outlets include a middle nozzle connected by air ducts with an air distributor and have a middle nozzle automatic button. A mixing chamber is integrated into the air distributor, the chamber having a cold air duct controlled by a cold air flap for supplying cold air to the mixing chamber and at least one outlet opening to the middle level. Air supplied to the middle level is controllable by at least one middle level flap, with an automatic control device that has an additional automatic button, and with a control device for linking signal values of the adjusting elements and programmed control of adjusting motors to adjust the air flaps.

A heating and/or air conditioning system of this type is known from EP 0 102 611 B1. The air stream for the passenger compartment is regulated in terms of temperature using a cold air flap located with air-side devices in the cold air duct. The quantity of air that enters the passenger compartment through the center nozzle is regulated by a shutoff flap. The cold air flap and the shutoff flap can be adjusted independently of one another over a broad range. The two flaps are forcibly controlled when the shutoff flap is closed to the point at which a relatively small air stream amounting to 30% of the maximum volume, for example, reaches the head area of the occupants. When the shutoff flap is closed further, the cold air flap is forcibly closed. This prevents an undesired stream of cold air from reaching the foot area and the defroster nozzles. The type of control for the flaps requires independent control to move the two flaps.

This invention, therefore, is based on the idea of simplifying the automatic regulation of the heating and/or air conditioning system set on the control device and the automatic regulation of the center nozzle and, at the same time, allowing manually adjusted temperature reduction at the middle level.

According to the invention, this goal is achieved by coupling the cold air flap and the at least one middle level flap together by forced guidance defining their movement possibilities such that, for maximum heating, the cold air flap and the middle level flap are closed, to regulate the air flow to middle level, the cold air flap is closed and the middle level flap is opened, depending on the desired volume of air, and to lower the temperature of middle level, the middle nozzle automatic button is unlocked and the cold air flap is opened accordingly by turning an operating element. Advantageous improvements and additions also described and claimed.

An important advantage of the invention is that, in order to move the cold air flap and the middle level flaps by a guide element, only one adjusting motor is required to permit both automatic regulation of the heating and/or air conditioning system adjusted by the control device and automatic regulation of the middle nozzle. In the same way, the desired temperature drop at the middle level can be achieved by opening the cold air flap and unlocking the automatic regulation of the middle nozzle and by manual adjustment of the middle nozzle.

BRIEF DESCRIPTION OF THE DRAWINGS

The invention will now be described in greater detail with reference to the drawing figures.

DESCRIPTION OF THE PREFERRED EMBODIMENT

Figure 1:
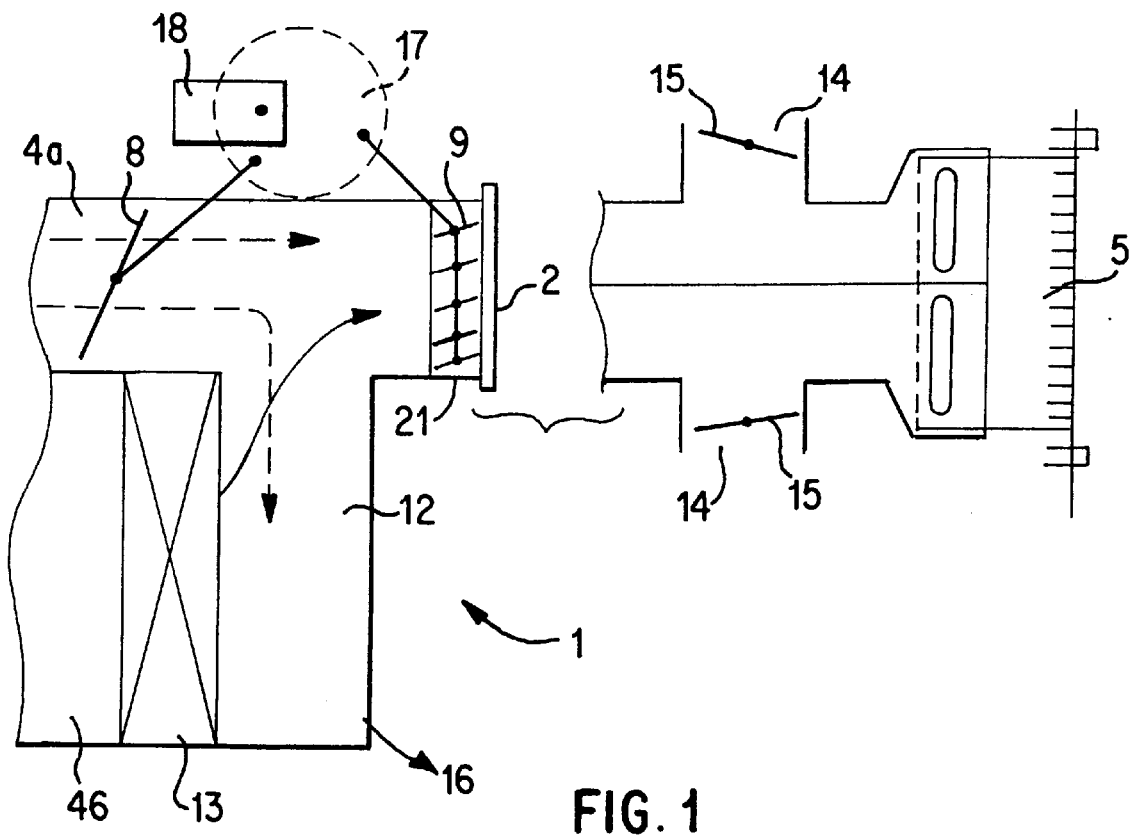
FIG. 1 is a cross section through a heating and/or air conditioning system with temperature stratification between the middle level and the foot area.

FIG. 1 shows a cross section through a heating and/or air conditioning system 1 that has a cold air duct 4a through which the cold air enters a mixing chamber 12, with the quantity of cold air being regulated by a cold air flap 8 located in the cold air duct 4a. A heat exchanger 13 is located in hot air duct 4b, through which warm air enters mixing chamber 12. In the mixing chamber 12, the warm air mixes with the cold air flowing in through the cold air duct 4a. The quantity of cold air flowing into mixing chamber 12 is controlled by opening cold air flap 8. The warm air duct 4b is located in the lower part of mixing chamber 12 and the cold air duct 4a is located in the upper part of mixing chamber 12. Mixing chamber 12 has at least one outlet opening 21 to the middle level 2, with at least one middle level flap 9 being provided to control the air to middle level 2. Several middle level flaps 9 are connected with one another so that moving one middle level flap 9 also moves the others. In the following, therefore, one middle level flap 9 will be referred to, although several middle level flaps 9 may actually be used. The air in middle level 2 is then distributed to the middle nozzle 5 and the right and left side nozzles 14. Both the middle nozzle 5 and the side nozzles 14 can be closed by flaps 19 to control the volume of air. Each of the right and left side nozzles includes a flap 15 therein. Outlet openings from mixing chamber 12 into foot area 16 are also provided; these outlet openings are located in the lower area of mixing chamber 12. The air is warmer In the lower part of mixing chamber 12 than in the upper part of mixing chamber 12 because the heat exchanger 13 is located in the lower area. The foot area temperatures are therefore the warmest and the middle nozzle temperatures are the coolest. The foot area is usually heated to a greater degree than the middle level 2 through which the air is conducted into the head area. The middle level flap 9 and the cold air flap 8 are coupled together by a forced guide. The forced guide has a guide element 17 coupled with cold air flap 8 and middle level flap 9 as a control disk, and the element is moved by an adjusting motor 18. The forcibly guided movement of middle level flap 9 and cold air flap 8 is performed in accordance with the diagram shown in FIG. 3.

Figure 2:
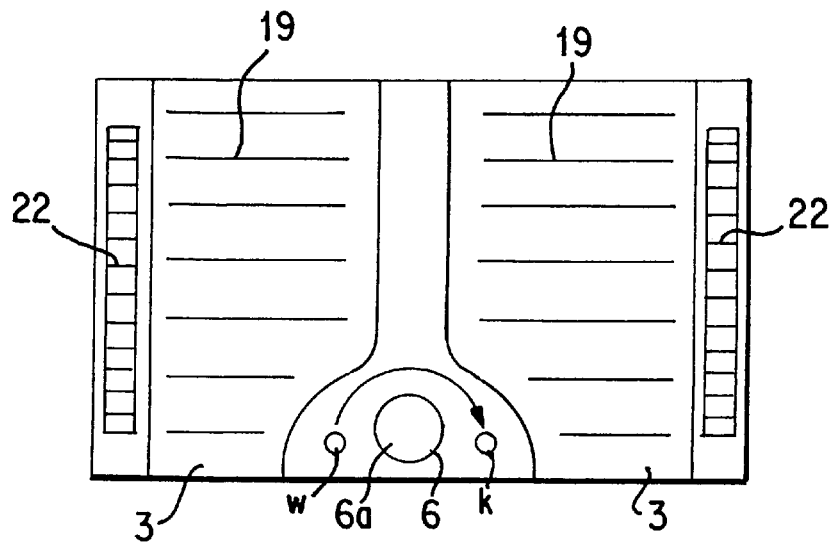
FIG. 2 is a front view of a middle nozzle.

FIG. 2 shows a front view of a middle nozzle 5, located in the interior of a vehicle. Middle nozzle 5 has a right-hand and a left-hand air outlet 3 that can be closed by flaps 19, with flaps 19 being adjustable individually by operating elements 22 located laterally with respect to them. For automatic control of middle nozzle 5, a middle nozzle automatic button 6 is provided which controls middle nozzle 5 automatically after locking. When the middle nozzle automatic button 6 is not activated, the temperature is varied from warm w to cold k by turning the operating element 6a that forms the middle nozzle automatic button 6 in the direction of the arrow. This permits manual temperature reduction in the middle level.

Figure 3:
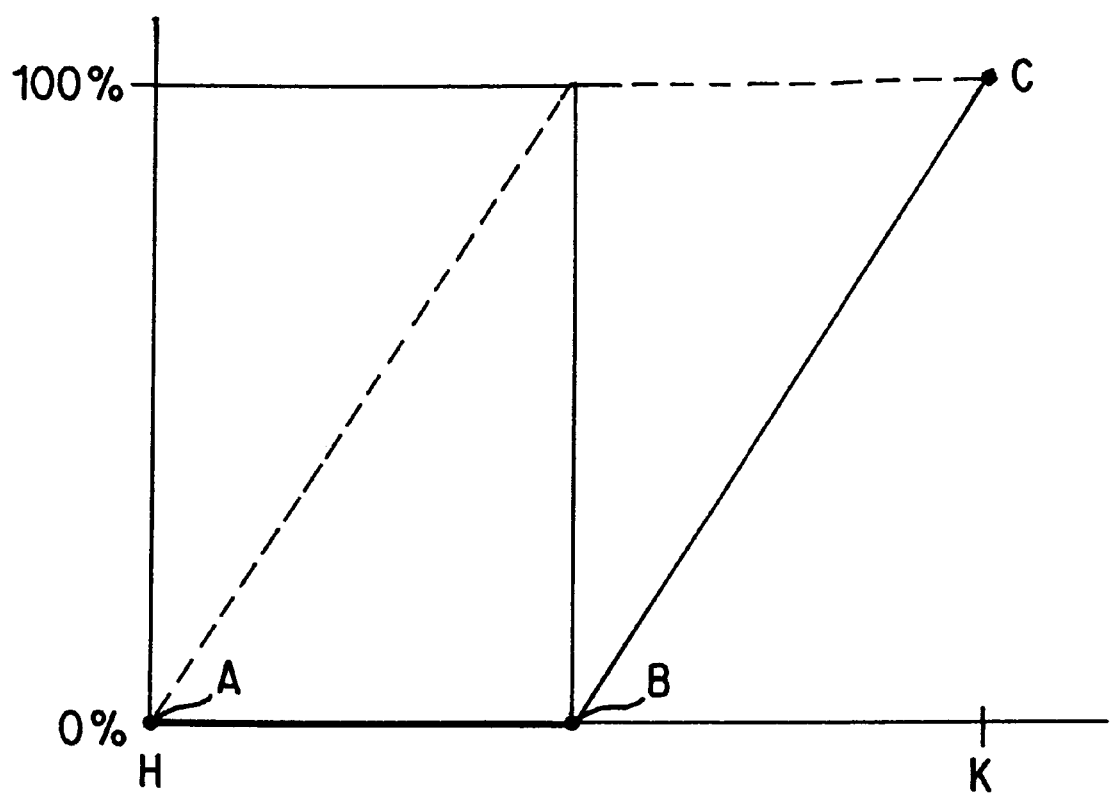
FIG. 3 is a diagram of forced control of the cold air flap and the middle level flap.

FIG. 3 shows a graph of the forcibly guided control curve of cold air flap 8 and middle level flap 9 in FIG. 1. In the graph, the opening of flaps 8, 9 is plotted as a percentage versus the temperature of the air stream from warm H to cold K. The curve drawn as a dashed line describes the position of middle level flap 9 while the solid curve describes the position of cold air flap 8. The position of flaps 8, 9 in A describes maximum heating; both the middle level flap 9 and the cold air flap 8 are closed. Between positions A and B, the middle nozzle automatic button 6 is locked. The automatic operating device regulates the volume of air to middle level 2 optimally by opening the middle level flap 9 from closed at A to completely open at B. At B, the middle level flap 9 is open 100% and the cold air flap 8 is closed. This position B of the middle level flap 9 and the cold air flap 8 is set when unlocking the middle nozzle automatic button 6. The middle level flap 9 is completely open, and by turning operating element 6a, which has middle nozzle automatic button 6, in the direction of the arrow as shown in FIG. 2, the cold air flap 8 is opened accordingly and mixing chamber 12 receives cold air, so that a manual temperature decrease in middle level 2 is achieved. This process is described in the graph between positions B and C. With middle nozzle automatic button 6 locked, the operating automatic system again assumes control over middle level 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Heating and/or air conditioning system for a vehicle interior with air outlets located at a middle level of the vehicle interior, in the dashboard, said outlets comprising a middle nozzle connected by air ducts with an air distributor, said outlets having a middle nozzle automatic button, a mixing chamber integrated into the air distributor, said mixing chamber having a cold air duct controlled by a cold air flap for supplying cold air to the mixing chamber and at least one outlet opening to said middle level, air to said middle level being controllable by at least one middle level flap, an automatic control device that has an additional automatic button, and a control device for linking signal values of the adjusting elements and programmed control of adjusting motors to adjust the flaps, wherein the cold air flap and the at least one middle level flap are coupled together by forced guidance in their movement possibilities such that: for maximum heating, the cold air flap and the middle level flap are closed; to regulate the air flow to the middle level, the cold air flap is closed and the middle level flap is opened depending on the desired volume of air; and, to lower the temperature of the middle level, the middle nozzle automatic button is unlocked and the cold air flap is opened accordingly by turning an operating element.

2. Heating and/or air conditioning system according to claim 1 wherein the forced guidance comprises a guide element, coupled with the cold air flap and the middle level flap, which can be moved by an adjusting motor.

3. Heating and/or air conditioning system for a vehicle interior comprising:

air outlets located in a dashboard at a middle level of the vehicle interior, said outlets comprising a middle nozzle, air ducts by which said middle nozzle is connected with an air distributor, a middle nozzle automatic button by which said middle nozzle is controlled, a mixing chamber integrated into the air distributor, said mixing chamber having a cold air duct, a cold air flap by which an opening of the cold air duct is controlled for supplying cold air to the mixing chamber, said mixing chamber having at least one outlet opening to said middle level, at least one middle level flap by which air to the middle level is controllable, an automatic control device having an additional automatic button and linking signal values of the adjusting elements and programmed control of an adjusting motor to adjust the flaps, and forced guidance elements by which the cold air flap and the at least one middle level flap are coupled together in their movement possibilities such that, for maximum heating, the cold air flap and the middle level flap are closed, the cold air flap is closed and the middle level flap is opened, depending on the desired volume of air, to regulate the air flow to the middle level, and the middle nozzle automatic button is unlocked and the cold air flap is opened accordingly by turning an operating element to lower the temperature of the middle level.

4. Heating and/or air conditioning system according to claim 3, wherein the forced guidance elements include a guide element, coupled with the cold air flap and the middle level flap, and made by the adjusting motor.

5. Heating and/or air conditioning system according to claim 3, wherein said air outlets located in the dashboard include right-hand and left-hand air outlets.

6. Heating and/or air conditioning system according to claim 3, and further comprising adjustable flaps by which said air outlets located in the dashboard can be closed.

7. Heating and/or air conditioning system according to claim 6, and further comprising at least one operating element by which said flaps can be manually adjusted.

8. Heating and/or air conditioning system according to claim 3, and further comprising a hot air duct leading into said mixing chamber.

9. Heating and/or air conditioning system according to claim 8, and further comprising a heat exchanger located in said hot air duct.

10. Heating and/or air conditioning system according to claim 3, wherein, as the temperature of the air flow is adjusted from hot to cold, the middle level flap opens from 0% to 100% while the middle nozzle automatic button is locked and the cold air flap is closed.

11. Heating and/or air conditioning system according to claim 10, wherein, after the middle flap has opened to 100%, the cold air flap is opened as the temperature is adjusted from hot to cold.

12. Heating and/or air conditioning system according to claim 4, wherein said air outlets located in the dashboard include right-hand and left-hand air outlets.

13. Heating and/or air conditioning system according to claim 4, and further comprising adjustable flaps by which said air outlets located in the dashboard can be closed.

14. Heating and/or air conditioning system according to claim 13, and further comprising at least one operating element by which said flaps can be manually adjusted.

15. Heating and/or air conditioning system according to claim 4, and further comprising a hot air duct leading into said mixing chamber.

16. Heating and/or air conditioning system according to claim 15, and further comprising a heat exchanger located in said hot air duct.

17. Heating and/or air conditioning system according to claim 5, and further comprising adjustable flaps by which said air outlets located in the dashboard can be closed.

18. Heating and/or air conditioning system according to claim 17, and further comprising at least one operating element by which said flaps can be manually adjusted.

19. Heating and/or air conditioning system according to claim 5, and further comprising a hot air duct leading into said mixing chamber.

20. Heating and/or air conditioning system according to claim 19, and further comprising a heat exchanger located in said hot air duct.

* * * * *